United States Patent [19]
Wilson

[11] 4,366,363
[45] Dec. 28, 1982

[54] WORKPIECE TRACING ARC WELDING SYSTEM

[76] Inventor: George S. Wilson, 3349 S. Point Au Gres Rd., Au Gres, Mich. 48703

[21] Appl. No.: 99,466

[22] Filed: Dec. 3, 1979

[51] Int. Cl.$^3$ .............................................. B23K 9/02
[52] U.S. Cl. ............................ 219/125.11; 219/60 A; 219/124.33; 228/32
[58] Field of Search ............. 219/125.1, 125.11, 60 A, 219/124.33; 228/25, 32

[56] References Cited

U.S. PATENT DOCUMENTS

| | | | |
|---|---|---|---|
| 2,522,146 | 9/1950 | Tichenor et al. | 219/125.11 |
| 2,914,011 | 11/1959 | Morton | 219/125.11 |
| 2,927,195 | 3/1960 | Arnaud | 219/125.11 |
| 3,658,232 | 4/1972 | Dill | 228/32 |
| 3,737,614 | 6/1973 | Paulange | 219/60 A |
| 4,112,289 | 9/1978 | Mead et al. | 219/125.11 |

FOREIGN PATENT DOCUMENTS 192321 4/1967 U.S.S.R. ........................ 219/60 A

Primary Examiner—C. C. Shaw

[57] ABSTRACT

An arc welding system for welding the edges of an irregularly contoured product comprising facially opposed sections held in joined position wherein, in the embodiment illustrated, a pair of arc welding torches, having arc generating tips are supported in product straddling relationship on a carriage for welding travel along different irregularly contoured lengths of the perimetral marginal boundary of the product, and control mechanism is provided for simultaneously altering the position of each torch tip in a portion of its welding travel to maintain each torch tip axis substantially perpendicular to the path of travel.

12 Claims, 7 Drawing Figures

WORKPIECE TRACING ARC WELDING SYSTEM

BACKGROUND OF THE INVENTION

While workpiece tracing arc welding torches have been suggested previously to satisfy different arc welding requirements on the same product and operated in unison, the system to now be described and claimed incorporates certain novel features or improvements of a significant nature which permit both new and improved results to be obtained in the welding of products of irregular contour.

One of the prime objects of the present invention is to design a very practical and novel system which provides for the compound movement of arc welding torches to trace the welding path desired.

Another object of the invention is to provide a system which, in the welding of irregular contours, controls the arc welding torch tips to maintain essentially the same gap between the torch tip and surfaces to be welded, regardless of the irregularity of the welding path.

Another object of the invention is to provide a multiple torch arc welding system of an inexpensive and compact nature which is capable of the relatively high, uniform speed welding of a wide variety of irregular contours which cannot be welded by other methods.

Still a further object of the invention is to design a more maintenance-free system for accomplishing the results outlined which avoids the use of parts such as chain drive systems for traveling torches.

SUMMARY OF THE INVENTION

An arc welding torch assembly is moved to cause the welding arc to travel an irregular path to weld irregular contours. The length of the arc is maintained constant during this travel. When the welding travel has been completed, the welded workpiece is removed and new parts are inserted and clamped in position.

Other objects and advantages of the systen will be pointed out specifically or will become apparent from the following description when it is considered in conjunction with the appended claims and the accompanying drawings in which:

Figure 4:
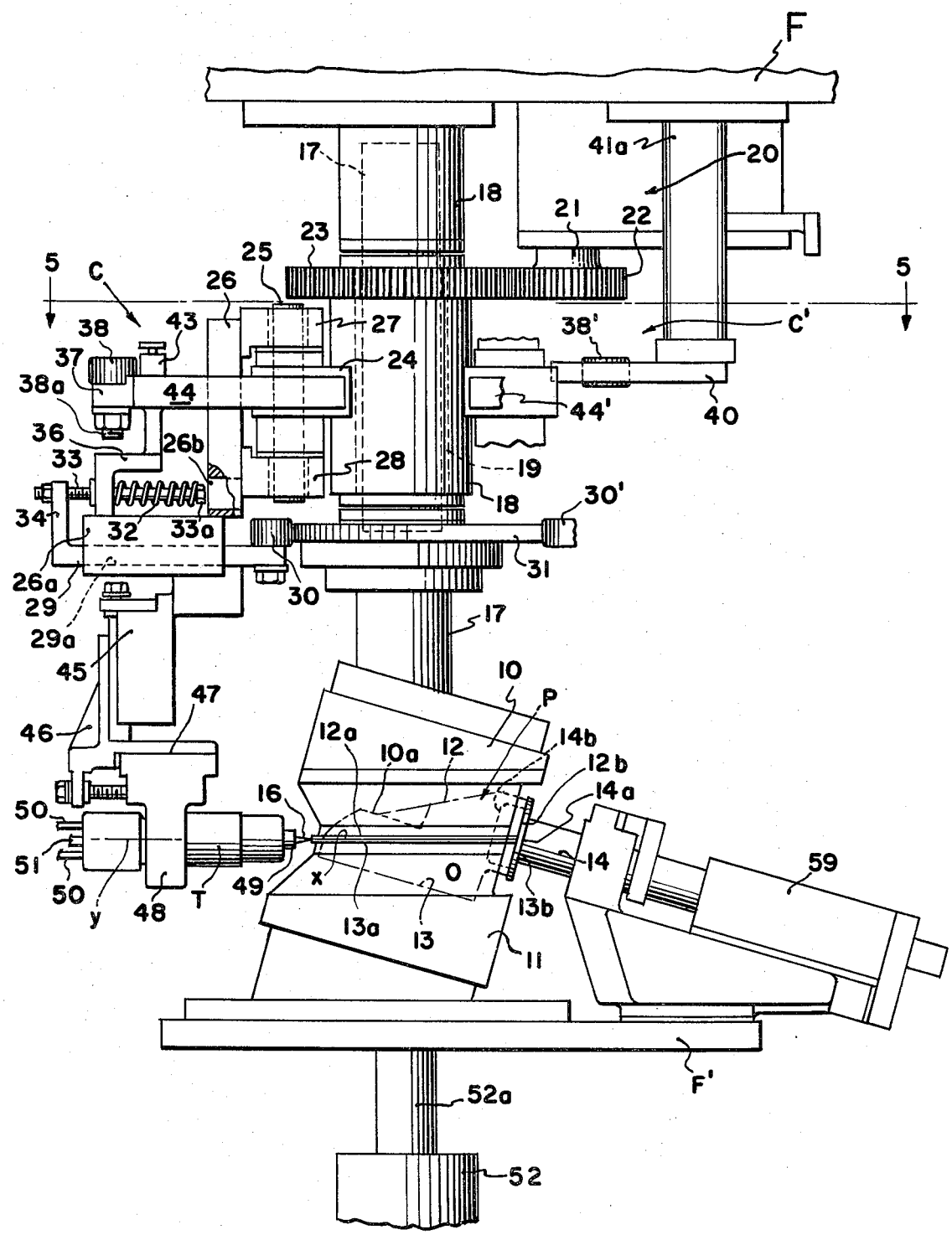
FIG. 4 is a side elevational view showing the parts of a typical product clamped in assembled position, only one of the arc welding torches being shown in welding position for purposes of clarity of illustration.

Referring now more particularly to the accompanying drawings, the machine frame is fragmentarily indicated at F in FIG. 4 and is shown as mounting an upper clamp generally designated 10. A lower clamp generally designated 11 is provided in conjunction with clamp 10 to securely locate the parts of an assembled product P which are to be welded together.

Figure 1:
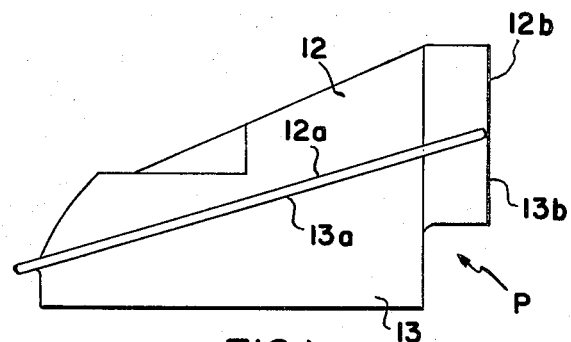
FIG. 1 is a side elevational view of a typical product which has been arc welded in the manner to be described.

Typically, the product P may comprise upper and lower shell-shaped sections 12 and 13 (FIG. 1) which have facially abutting flanges 12a and 13a extending substantially around the perimeter of the product P. At one end, each of the shell sections 12 and 13 terminate in an open-end (at 12b and 13b) to form a cylindrical pipe-like section with an opening O, and a locating fixture in the form of a plunger 14, having a flange 14a and a reduced size insert part 14b, is provided to enter this open end of the product P and assist in the product locating and clamping operation.

Figure 5:
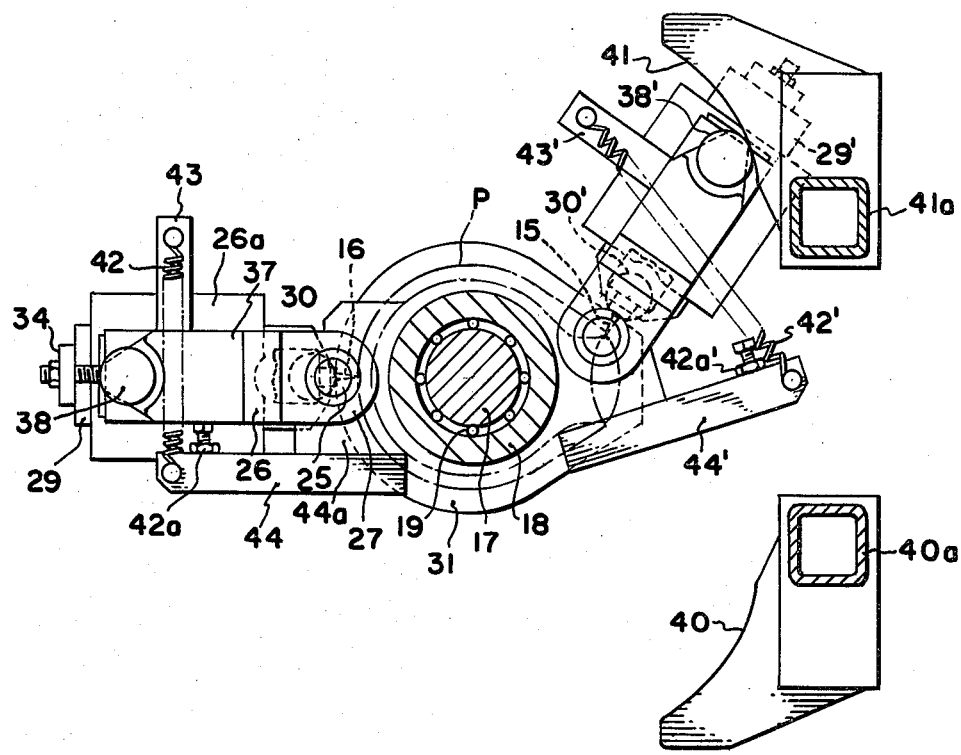
FIG. 5 is a partly schematic, sectional plan view taken on the line 5—5 of FIG. 4, and showing both welding torches in initial position.
Figure 6:
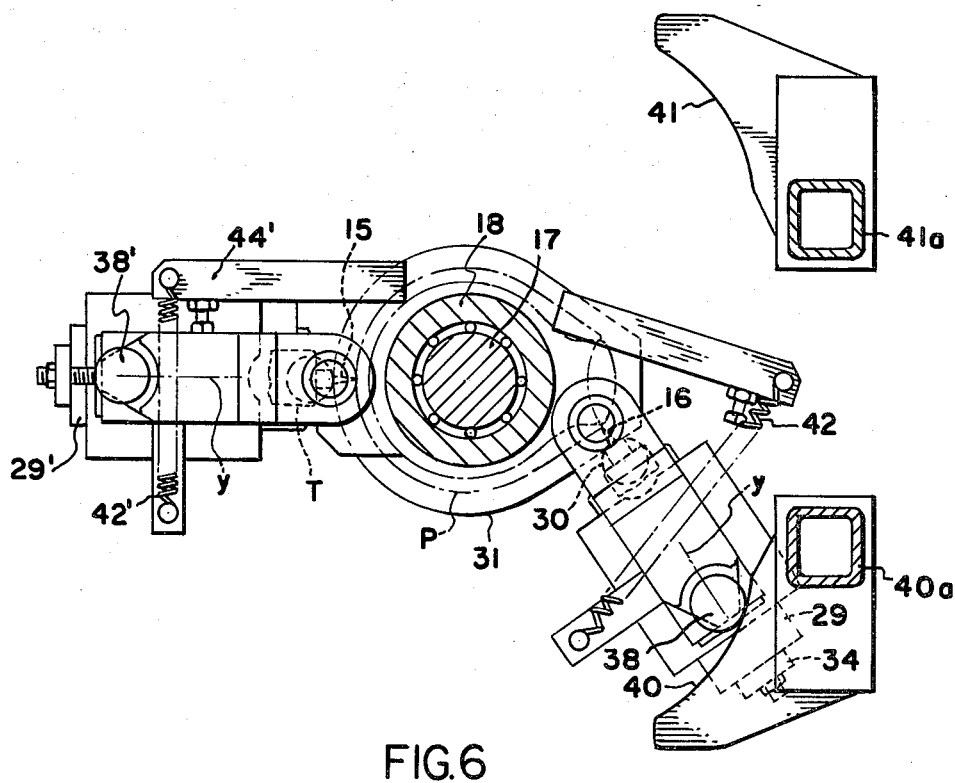
FIG. 6 is a similar view, with the welding torches being shown in a position in which they have completed a welding pass.

As FIGS. 5 and 6 particularly indicate, a pair of product-straddling welding torches T having tips 15 and 16 are provided in the plane of the abutting surfaces of flanges 12a and 13a to orbit the irregular marginal boundary of the flanges 12a and 13a and provide a continuous weld w around the marginal boundary of flanges 12a and 13a, along the line x (FIG. 4) of their abutment.

Figure 2:
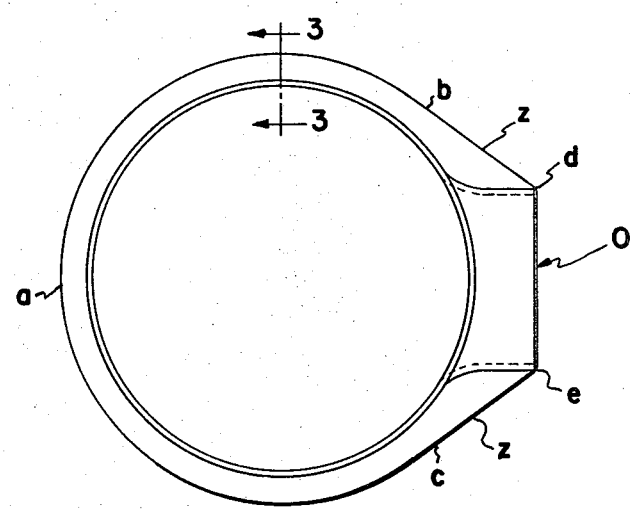
FIG. 2 is a top plan view thereof.

While FIG. 2 indicates that the outer marginal boundary of the product may be circular (because the view is a plan view of a product which is clamped in tilted position) it actually is slightly elliptical in shape from the point a to the points b and c. From the points b and c to the open end of the product at d and e, respectively, the outer boundary of the workpiece is linear.

FIG. 5 indicates the initial position of the welding torch tips 15 and 16, and FIG. 6, the terminal position of each. In FIG. 6, the tip 15 has moved essentially to the position formerly occupied by torch tip 16 and completed half of the welding task, and torch tip 16 has simultaneously moved to the opposite end of the workpiece P adjacent opening O, and completed the remainder of the arc welding operation to be performed on product P.

The upper work holding clamp 10, which has a cavity 10a shaped to the configuration of the upper shell section 12, is mounted on a shaft 17 which is non-rotatably positioned within a housing 18 depending from an upper portion of frame F.

The shaft 17 serves not only to support work holding clamp 10, but also supports a rotatable carriage sleeve 18 which is fixed vertically and separated from shaft 17 by a suitable roller bearing structure 19 so that it is revolvable thereon. A reversible motor and drive assembly 20 has an output shaft 21 with a gear 22 thereon in mesh with a gear 23 which is keyed to and drives sleeve 18. As will be explained in more detail later, the motor drive assembly 20 drives gear 23 through approximately half a revolution and then, after a dwell period to permit replacement of new shell sections 12 and 13 to be welded, reverses direction and travels half a revolution in the opposite direction back to original position.

Supports 24 fixed to and extending oppositely from carriage sleeve 18 fix pivot pins 25. Mounted on the rotatable pins 25, are the carriage assemblies C and C' which support torches 15 and 16. For purposes of clarity of illustration only the carriage assembly for torch tip 16 has been disclosed in FIG. 4, but it is to be understood that the carriage assembly C' for torch tip 15 is identical and that primed numerals have been used where appropriate to identify identical parts. Sleeve 18 and assemblies C and C' constitute together a torch supporting and manipulating carriage.

The carriage assemblies C and C' include a vertically extending clevis comprising bar 26 having upper and lower bearings 27 and 28 received on pin 25. At its lower end, bar 26 supports a slide housing 26a having a way or recess 29a in which a slide 29 is received. The slide 29 at its front end, mounts a follower roller 30. Follower roller 30 is maintained in engagement with a stationary cam 31 (conforming to the shape of the product) provided on shaft 17 by a spring 32 mounted on and adjustable rod 33 supported on the upstanding ear portion 34 of slide 29 and on a brace 36. Clevis plate 26 has an opening 26a permitting movement of the spring retaining nut 33a on the end of rod 33 without interference. The S-shaped brace 36 also supports a plate 37 which connects to clevis bar 26. A follower roller 38 is rotatably mounted on the plate 37 on stud 38a, and as FIG. 6 shows, the follower roller for torch 16 is adapted at one end of the torch's path of travel to engage a cam surface 40, while, as FIG. 5 shows, the follower roller 38' for torch assembly 15 is initially engaged with a cam surface 41.

As FIGS. 4–6 indicate, the cams 40 and 41 are supported by dependent posts 40a and 41a, respectively from frame F. When the roller 39 for the torch tip assemblies 16 engages the cam 40, it will pivot the torch carriage C about pivot pin 25 to alter the position of the torch tip 16 with respect to the surfaces being welded and maintain the critical predetermined welding gap. The same thing occurs, of course, with torch tip 15 when roller 38' engages cam 41. When permitted to do so by the cam 40, spring 42 connected between a bar 43 projecting outwardly from roller mounting plate 37 and the bar 44, which is connected to the rotatable carriage sleeve mount 24 by rib 44a, return the carriage C to a position in which plate 37 engages stop 42a. The spring 42' operates in the same way when permitted to do so by cam 41.

Each torch assembly, generally designated T, depends from its slide 29 on a bracket 45. Mounted for vertical adjustment as desired on bracket 45, is a second dependent bracket 46 which has a way 47 mounting a torch holder 48 for lateral adjustment back and forth to permit adjustment of the torches T along their axes y to permit initial positioning of the tips 15 and 16 with respect to the flanges 12a and 13a to set the critical arc gap.

The torches T are of the conventional type available in the marketplace wherein an inert gas such as argon or carbon dioxide is expressed from openings in the torch nozzle 49 surrounding the tip to flood the weld area and rid it of oxygen. Such torches which have flexible electric power supply and gas supply lines such as at 50 and 51, leading to them are sold, for instance, by the Linde Company division of Union Carbide Company along with the power supply and gas supply units, which are also commercially available.

As FIG. 2 particularly indicates, at the open end O of the housing sections being welded together, there are linear portions z. In order to keep the arc length the same, when the torch tips 15 and 16 are welding this area, the cams 40 and 41 pivot the torch carriages C or C' about pivot pins 25 at the required time to maintain the tip 15 or 16 axes perpendicular or normal to the surfaces being welded. With the present system, the critical length of the welding arc is maintained, regardless of the fact that the contour of the surfaces being welded changes.

As indicated earlier, the part P is held tightly in position by workpiece clamping members 10, 11 and 14. The holder 10 is mounted in vertically fixed position, but holding clamp 11, which similarly is shaped to the configuration of shell 13, is mounted on a vertically movable pedestal frame F' operated by a fluid pressure operated cylinder 52, having a piston rod 52a which moves the frame upwardly and downwardly. Cylinder 52 may be a double acting solenoid energized cylinder, with a piston retraction control circuit line 53 for the valve actuating solenoid 54, and contacts 55 which, when closed, energize the circuit to retract the piston 52a and lower clamp 11. The piston advancing circuit control line 56 includes contacts 57 which, when closed, energize solenoid 58 to advance the piston rod 52a to clamping position.

The pedestal frame F' also carries the preferably double acting cylinder 59 for advancing and retracting piston rod 14. A control circuit line 60 having contacts 61 and a solenoid 62 can be energized to retract piston 14 and release the product P. Also provided is a control circuit line 63 having contacts 64 which, when closed, energize a solenoid 65 to advance piston rod 14 to a clamping position within the opening O in the product P. Of course, when one set of contacts 61 or 64, or 55 or 57, is closed, the other is opened.

Figure 7:
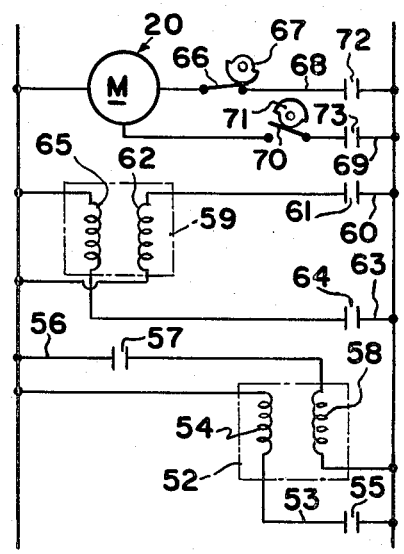
FIG. 7 is a schematic view illustrating elements of an electrical control circuit which can be employed.

The schematic control system depicted in FIG. 7 also includes the motor M forming part of the drive assembly 20 and may include a switch 66, operated by a cam 67 connected in a control circuit line 68 with the field windings of the reversible motor M to drive the motor M in one direction of travel. A control circuit line 69 connected in circuit with the reversing field windings of motor M has a switch 70 operated by a cam 71 for driving motor M in the opposite direction. Contacts 72 and 73 are provided to open and close circuit lines 68 and 69 respectively, during the time when a welded product is being removed and parts to be subsequently welded are being loaded.

THE OPERATION

Figure 3:
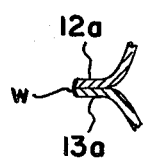
FIG. 3 is a transverse sectional view taken on the line 3—3 of FIG. 2.

As FIG. 3 indicates, it is desired to melt weld material w to weld the flanges 12a and 13a of the product over their entire length from one edge of the pipe opening O in the assembled product P to the other. As indicated in FIG. 5, torch tip 15 is responsible for welding the product along its marginal edge from point d to point a and torch tip 16 is responsible for welding the flanges from point a to point e. When motor M is energized to initially drive shaft 18 and the carriages C and C' in a counterclockwise direction in FIG. 5, the cam roller 39 is initially in engagement with cam surface 41, and the longitudinal axis y of torch tip 15 is perpendicular to the portion z of flanges 12a and 13a directly opposite it at point d. As shaft 18 rotates counterclockwisely in FIG. 5, to move the torch 15 along its welding path of travel, the cam surface 41 will maintain the torch tip 15 perpendicular to the flanges 12a and 13a. At the point b, roller 39' will be returned to its normal position against stop 42a' by spring 42', rotating carriage C' about pin 25' so that the axis y of tip 15 remains normal to the portion b–a of the slightly elliptical arc b–a–c. When torch tip 15 is in the position in which it is shown in FIG. 5, its slide 29 will be in radially outermost position with follower 30' in engagement with the most eccentric portion of cam 31. During the time that the torch tip 15 is traveling from the position d to the position b, its spring 32 will cause its slide 29 to return to the slightly elliptical portion of cam 31, as carriage C revolves in a counterclockwise direction about cam 31. Torch tip 16 simultaneously travels in its welding path and starts at the position a. Until it reaches position c, its slide 29 has moved only slightly to accommodate to the elliptical contour. At the time point c is reached, slide 29 is forced further radially outwardly by cam 31 until it is in its fully outward position at the time the torch tip 16 reaches the point e. Also, during the time that torch tip 16 is proceeding to weld the boundary of flanges 12a–13a from the location c to the location e, torch tip 16 has rotated sufficiently to maintain its position of perpendicularity with respect to the surfaces c–e. This occurs because roller 38' has come into engagement with cam surface 40, and has caused the carriage C to rotate sufficiently about pin 25 to cause this change in rotary position of torch tip 16.

When the torch tips 15 and 16 have reached the position shown in FIG. 6, and after the completed product has been unclamped and a new one loaded and moved into welding position, motor M is reversed in direction and the torch tips 15 and 16 are moved in a welding path of travel back to original position. This occurs because cam 67 has rotated sufficiently to open limit switch 66, and cam 68 has rotated sufficiently to close limit switch 70. Prior to this contacts 72 and 73 have been opened by the machine operator to permit product unloading and reloading. Unloading and reloading can be accomplished by the operator manually, or can be accomplished automatically with the opening of contacts 64 and closing of contacts 61, which retracts piston rod 14, and the opening of contacts 57 and closing of contacts 55 to thereafter retract piston rod 52a to lower pedestal F'. It is when a new workpiece has been substituted that contacts 55 are opened, and contacts 57 closed to advance piston rod 52a and accordingly raise clamp 11. Subsequently piston rod 14 is advanced when contacts 64 are closed and contacts 61 are opened.

The system described, of course, is particularly advantageous to weld flanges which are too narrow or fragile to be seam welded. The system described is one in which welding can be accomplished at a relatively uniform velocity at speeds of as much as 30 inches per minute. Because a compound motion is effected which maintains a consistent arc length, the system has proved much more trouble-free than previous systems.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. In an arc welding system for joining portions of a symmetric product around the irregularly contoured, facially opposed, perimetral, marginal boundaries thereof; workpiece holding means on said frame means for holding the facially abutting separate sections in a joined fixed position in which their surfaces of abutment define a weld path in a weld plane; a pair of arc welding torches having axially extending arc generating tips supported with their axes in said plane directed at the abutment surfaces; a separate carriage for each torch supporting each torch for welding travel simultaneously along a different contoured length of the perimetral marginal boundary; a rotary shaft on which each carriage mounts for partial orbiting movement in a circular path; the carriages being in straddling position relative to the product, substantially oppositely mounted on the shaft; drive means for driving the shaft; a sub-carrier on each carriage; means mounting each sub-carrier for pivotal movement about an axis parallel to the shaft; a slide carried by each sub-carrier and mounted for radial travel thereon; a torch being mounted on each slide; a fixed cam about which said carriages orbit radially inward of said slides; means for urging said slides to maintain engagement with said fixed cam so as to be guided in radial travel thereby and maintain the tips at a constant distance from the weld path; cam follower surfaces on said sub-carrier; and fixed cam tracks engaged by said cam follower surfaces upon orbiting of said carriages to cause said sub-carriers to pivot and maintain the torch tips perpendicular to the weld path as the torches move along it.

2. In an arc welding system for joining portions of a product along an irregularly contoured, non-circular, facially opposed, perimetral, marginal boundary portion thereof; workpiece holding means for holding the facially abutting separate sections in joined position; an arc welding torch assembly having arc generating tip means; carriage means supported for orbital movement about an axis, supporting the torch assembly for welding travel along a contoured length of the perimetral marginal boundary; drive means for moving said carriage means in an orbital path of travel; means supporting the torch assembly on the carriage means for substantially radial in and out movement relative to said axis; cam means with which said torch assembly is engaged for moving the torch assembly radially as the carriage means is rotated to achieve welding along a non-circular path; and control mechanism for adjusting the position of said torch tip means as the carriage means travels in the irregular welding path of travel to maintain the torch tip means substantially normal to the contoured path of travel of the torch tip means along the product surfaces being welded.

3. The system of claim 2 wherein said drive means includes a rotary shaft and said carrier means comprises torch carrying carriages mounted for partial orbiting movement around the said marginal boundary of the product, each carrying a torch assembly with torch tip means; the carriages being in straddling position relative to the product, substantially oppositely mounted on the shaft.

4. The system of claim 3 wherein each carriage includes a radially moving slide on which the torch assembly is mounted; said cam means comprises a stationary cam; and the slides include followers engaging said cam which are controlled by said cam to permit said torch assemblies to follow non-circular orbiting paths of movement.

5. The system of claim 3 wherein pivot means are provided on said carriages to permit said tip means to swing relative to the marginal boundary contour of the product; and said control mechanism comprises a stationary cam track in position to be engaged by each carriage which is configured to swing the carriages about said pivot means to retain the tips extending substantially in perpendicular relation to the irregularities of the said boundary contour.

6. The system of claim 5 in which torch tip return means are carried by the carriages for normally urging said torch tips to a radial position relative to the boundary contour.

7. The system of claim 3 in which means drives said shaft through a part of a revolution in one direction and dwells, and then drives it in the opposite direction through a part of a revolution.

8. The system of claim 2 in which said workpiece holding means comprises a pair of opposing clamp members for gripping the separate positions of the product facially.

9. The system of claim 8 in which one of said clamps is mounted on a piston-cylinder assembly.

10. The system of claim 2 wherein said means for supporting the torch assembly on the carriage means comprises a slide mechanism and the slide mechanism is controlled by said cam means to permit said torch tip means to follow a non-circular orbiting path of movement.

11. The system of claim 10 wherein pivot means are provided to permit said torch tip means to swing relative to the marginal boundary contour of the product; and said control mechanism comprises a stationary cam track configured to swing the torch tip means to retain it extending substantially in perpendicular relation to the irregularities of the said boundary.

12. In an arc welding method for joining portions of a product along an irregularly contoured, facially opposed perimetral, marginal boundary portion thereof and wherein the product is held with the facially abutting separate sections in joined position, and a welding torch assembly having an arc generating tip is mounted on a supporting carriage, the steps of releasably clamping the workpiece in stationary position; orbiting the carriage about the marginal boundary portion in a path which does not conform to the irregular contour of the boundary portion; moving the welding torch assembly generally radially on the carriage in accordance with the orbiting movement to cause the tip to follow an off-orbit, irregular welding path of travel which combines orbiting carriage movement and torch assembly travel relative thereto to cause the tip travel to conform to the irregular contour of the boundary portion.

* * * * *

UNITED STATES PATENT AND TRADEMARK OFFICE
CERTIFICATE OF CORRECTION

PATENT NO. : 4,366,363
DATED : December 28, 1982
INVENTOR(S) : George S. Wilson

It is certified that error appears in the above-identified patent and that said Letters Patent is hereby corrected as shown below:

On the title page insert:

--[73] Assignee: RWC, Inc.
Bay City, Michigan--.

*Signed and Sealed this*

*Twenty-third* Day of *August 1983*

[SEAL]

*Attest:*

GERALD J. MOSSINGHOFF

*Attesting Officer*  *Commissioner of Patents and Trademarks*